(12) United States Patent　　(10) Patent No.: US 8,368,646 B2
Welland　　(45) Date of Patent: Feb. 5, 2013

(54) USER INTERFACE DEVICES

(76) Inventor: Robert Welland, Seattle, WA (US)

(*) Notice: Subject to any disclaimer, the term of this patent is extended or adjusted under 35 U.S.C. 154(b) by 911 days.

(21) Appl. No.: 11/952,428

(22) Filed: Dec. 7, 2007

(65) Prior Publication Data

US 2009/0146951 A1　　Jun. 11, 2009

(51) Int. Cl.
*G06F 3/033*　　(2006.01)
*G06T 13/00*　　(2006.01)
*G09G 5/00*　　(2006.01)
*A63F 9/24*　　(2006.01)

(52) U.S. Cl. .......... 345/158; 345/474; 345/156; 463/37; 463/39

(58) Field of Classification Search .......... 345/156–158, 345/163, 173, 179, 418, 474; 463/37, 39
See application file for complete search history.

(56) References Cited

U.S. PATENT DOCUMENTS

| | | | | |
|---|---|---|---|---|
| 4,414,537 A | * | 11/1983 | Grimes | 341/20 |
| 6,198,485 B1 | * | 3/2001 | Mack et al. | 345/419 |
| 6,515,669 B1 | * | 2/2003 | Mohri | 345/474 |
| 6,744,420 B2 | * | 6/2004 | Mohri | 345/157 |
| 2003/0038783 A1 | | 2/2003 | Baughman | |
| 2003/0142065 A1 | * | 7/2003 | Pahlavan | 345/156 |
| 2005/0052414 A1 | * | 3/2005 | Park et al. | 345/158 |
| 2006/0207950 A1 | * | 9/2006 | Kiehnau et al. | 211/59.2 |
| 2007/0013657 A1 | | 1/2007 | Banning | |
| 2007/0146322 A1 | | 6/2007 | Lapstun et al. | |
| 2008/0084385 A1 | * | 4/2008 | Ranta et al. | 345/157 |
| 2011/0210931 A1 | * | 9/2011 | Shai | 345/173 |

* cited by examiner

*Primary Examiner* — Lun-Yi Lao
*Assistant Examiner* — Jarurat Suteerawongsa
(74) *Attorney, Agent, or Firm* — JW Law Group; James M. Wu

(57) ABSTRACT

A method and apparatus of user interface having multiple motion dots capable of detecting user inputs are disclosed. In one embodiment, a user interface ("UI") device includes a first motion dot and a second motion dot. The first motion dot is capable of attaching to a first finger and the second motion dot is configured to attach to a second finger. The first finger, in one example, is a thumb and the second finger is an index finger. The first motion dot includes multiple accelerometers used for identifying the physical location of the first motion dot. The second motion dot, which is logically coupled to the first motion dot via a wireless communications network, is capable of detecting a user input in response to a relative physical position between the first and the second motion dots.

20 Claims, 12 Drawing Sheets

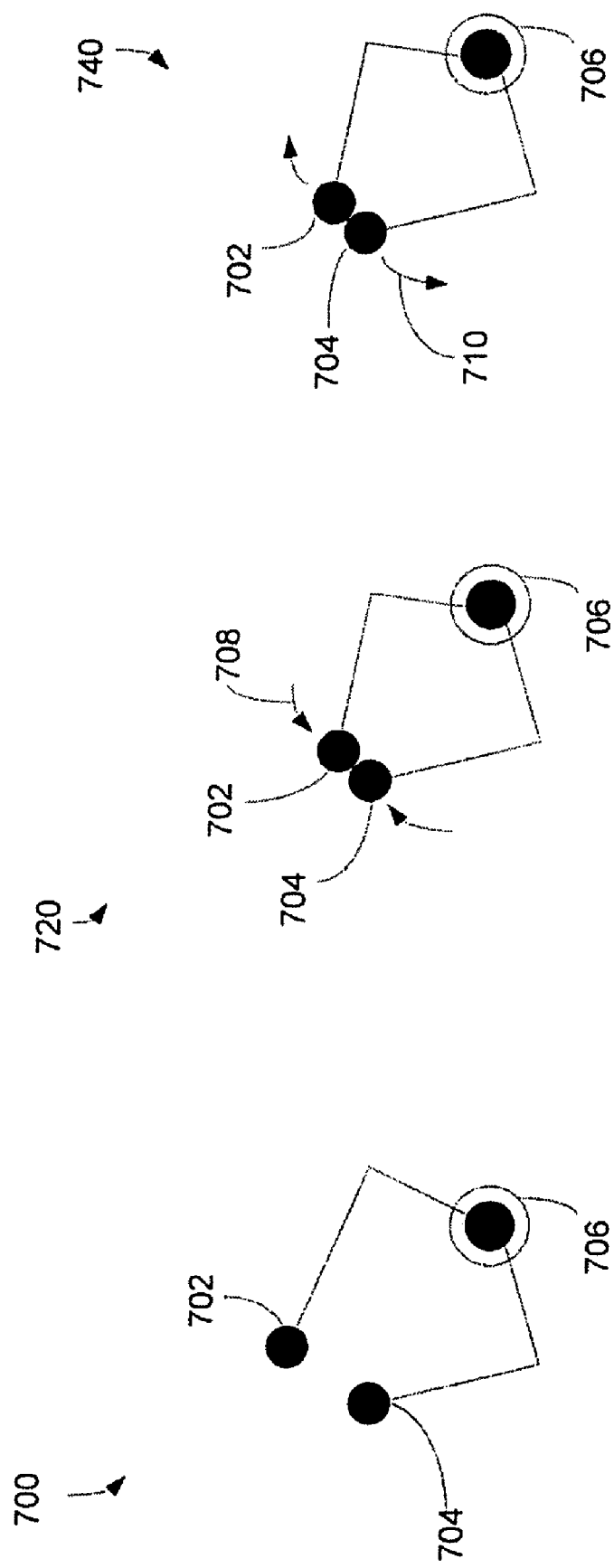

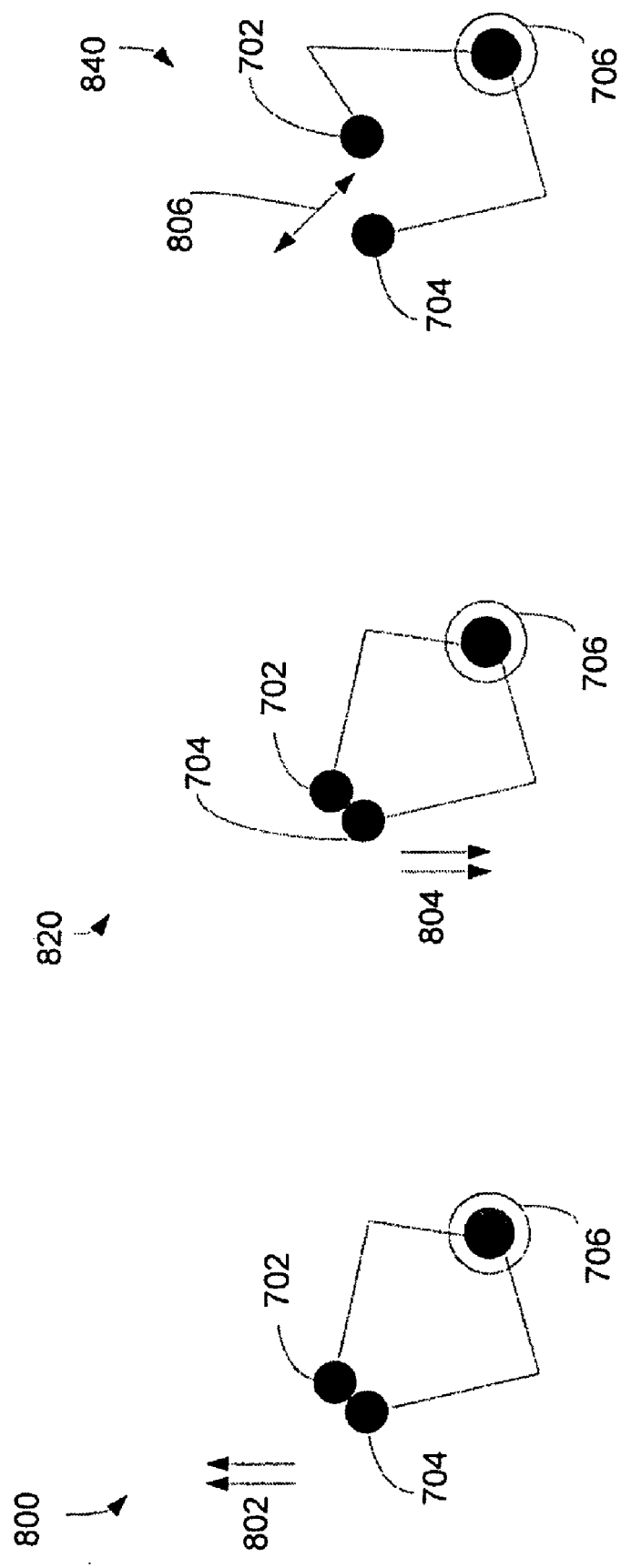

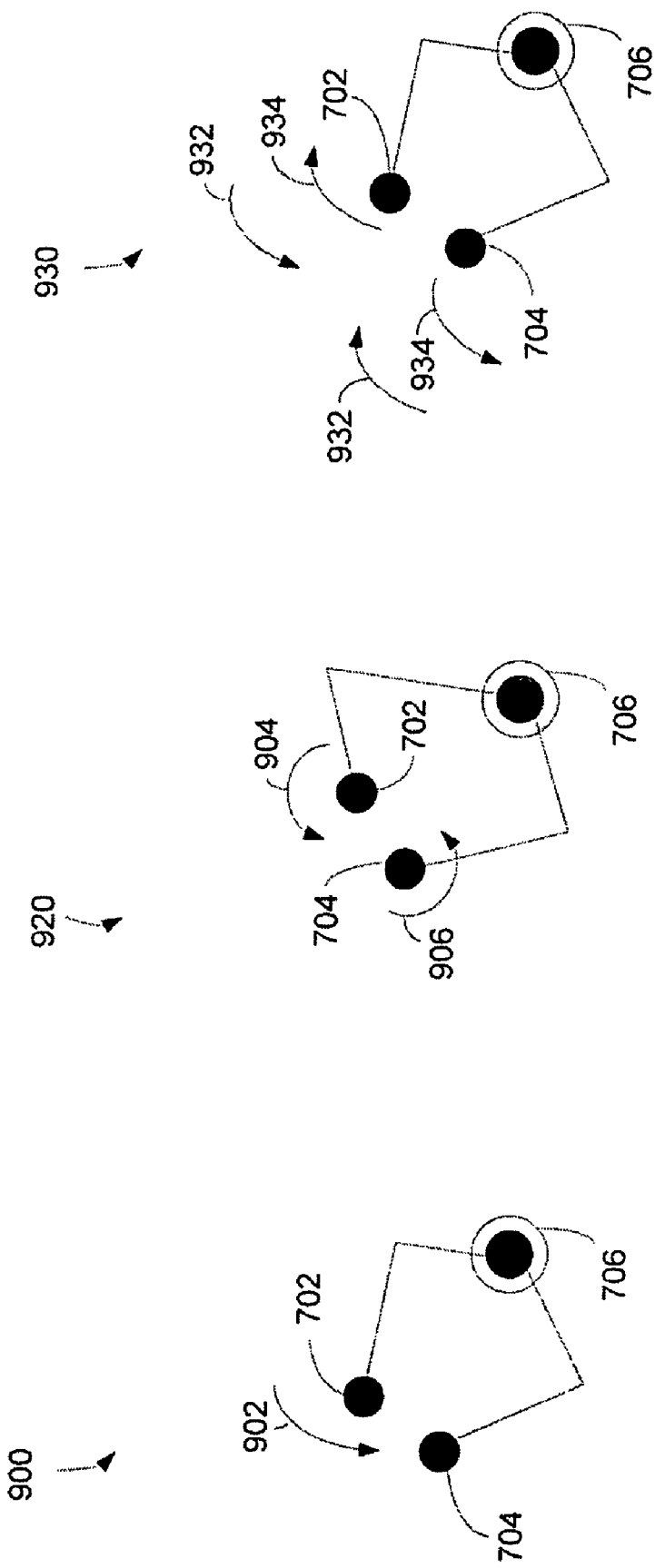

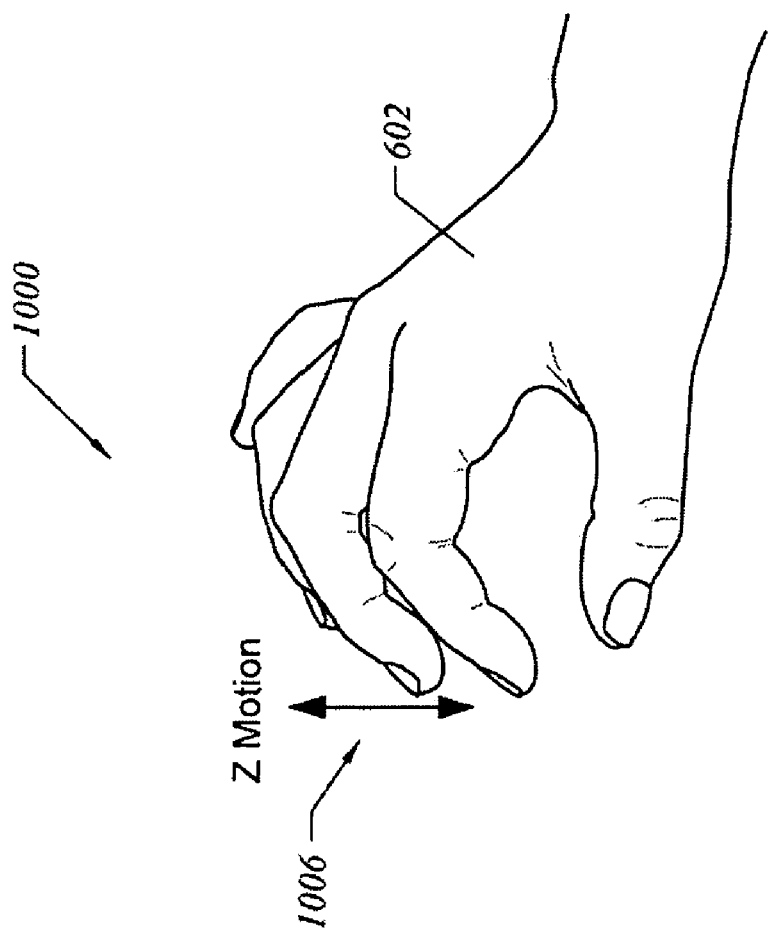
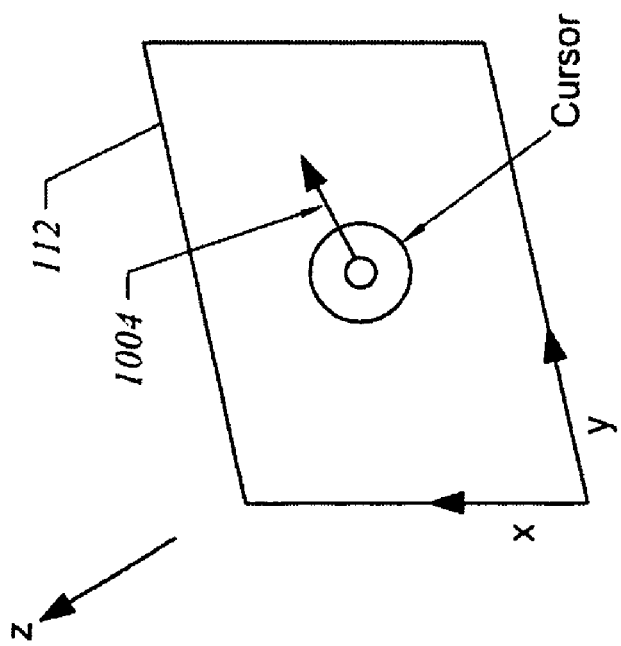
FIG. 10

USER INTERFACE DEVICES

FIELD

The exemplary embodiment(s) of the present invention relates to the field of electronic communication devices. More specifically, the exemplary embodiment(s) of the present invention relates to user interface devices for portable devices.

BACKGROUND

With increasing popularity of handheld or portable devices such as iPhone®, Blackberry®, PDA (Personal Digital Assistants), cellular phones, and the like, the handheld devices are not only getting more powerful with sophisticated networking functionalities, but also getting more compact. While the portable devices can typically access ubiquitous information, such as e-mail, instant messages, VoIP (Voice over IP), video, photos, and the like, user interface ("UI") devices for such portable devices become less intuitive and troublesome. Various currently available UI devices, such as touch-pads (PDAs and the iPhone®) or miniature keyboards (Blackberry®), are less user-friendly and intuitive. For example, touch pads allow larger screen areas than a keyboard and provide direct manipulation UI.

A problem associated with a typical touch pad is that the user's hand and fingers obscure the users' ability to see the screen when the users try to touch the pad. For example, selecting text using a finger over a portable screen can be cumbersome.

Another problem associated with a touch pad is that it is limited to two-dimensional implementation. For example, it can cause confusion to differentiate a scrolling gesture (touching the screen and moving your finger) from a navigation gesture (touching the screen).

SUMMARY

A user interface ("UI") device having multiple moving dots capable of detecting user inputs is disclosed. In one embodiment, the UI device includes a first motion dot and a second motion dot. The first motion dot is capable of attaching to a first finger and the second motion dot is configured to attach to a second finger. The first finger, in one example, is a thumb and the second finger is an index finger. The first motion dot includes multiple accelerometers used for identifying the physical location of the first motion dot. In an alternative embodiment, the first motion dot further includes a gyroscope to monitor the orientation of the first motion dot attached to a finger. The second motion dot, which is logically coupled to the first motion dot via a wireless communications network, is capable of detecting a user input in response to a relative physical position between the first and the second motion dots.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

FIGS. 7-9 are exemplary diagrams illustrating computer graphic representations for detectable input commands in accordance with one embodiment of the present invention;

FIG. 10 is a 3-D graphic representation illustrating a command input in accordance with one embodiment of the present invention.

DETAILED DESCRIPTION

Embodiments of the present invention are described herein in the context of a method, system, and apparatus for communicating with a portable device using multiple motion dots.

Those of ordinary skilled in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the exemplary embodiments of the present invention as illustrated in the accompanying drawings. The same reference indicators (or numbers) will be used throughout the drawings and the following detailed description to refer to the same or like parts.

In the interest of clarity, not all of the standard hardware and routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skilled in the art having the benefit of this disclosure.

A user interface ("UI") device having multiple motion dots capable of detecting user inputs is disclosed. In one embodiment, the UI device includes a first motion dot and a second motion dot. The first motion dot is capable of attaching to a first finger and the second motion dot is configured to attach to a second finger. The first finger, in one example, is a thumb and the second finger is an index finger. The first motion dot includes multiple accelerometers used for identifying the physical location of the first motion dot. In an alternative embodiment, the first motion dot further includes a gyroscope to detect the orientation of the first motion dot. The second motion dot, which is logically coupled to the first motion dot via a wireless communications network, is capable of detecting a user input in response to a relative physical position or relative motion between the first and the second motion dots.

Figure 1:
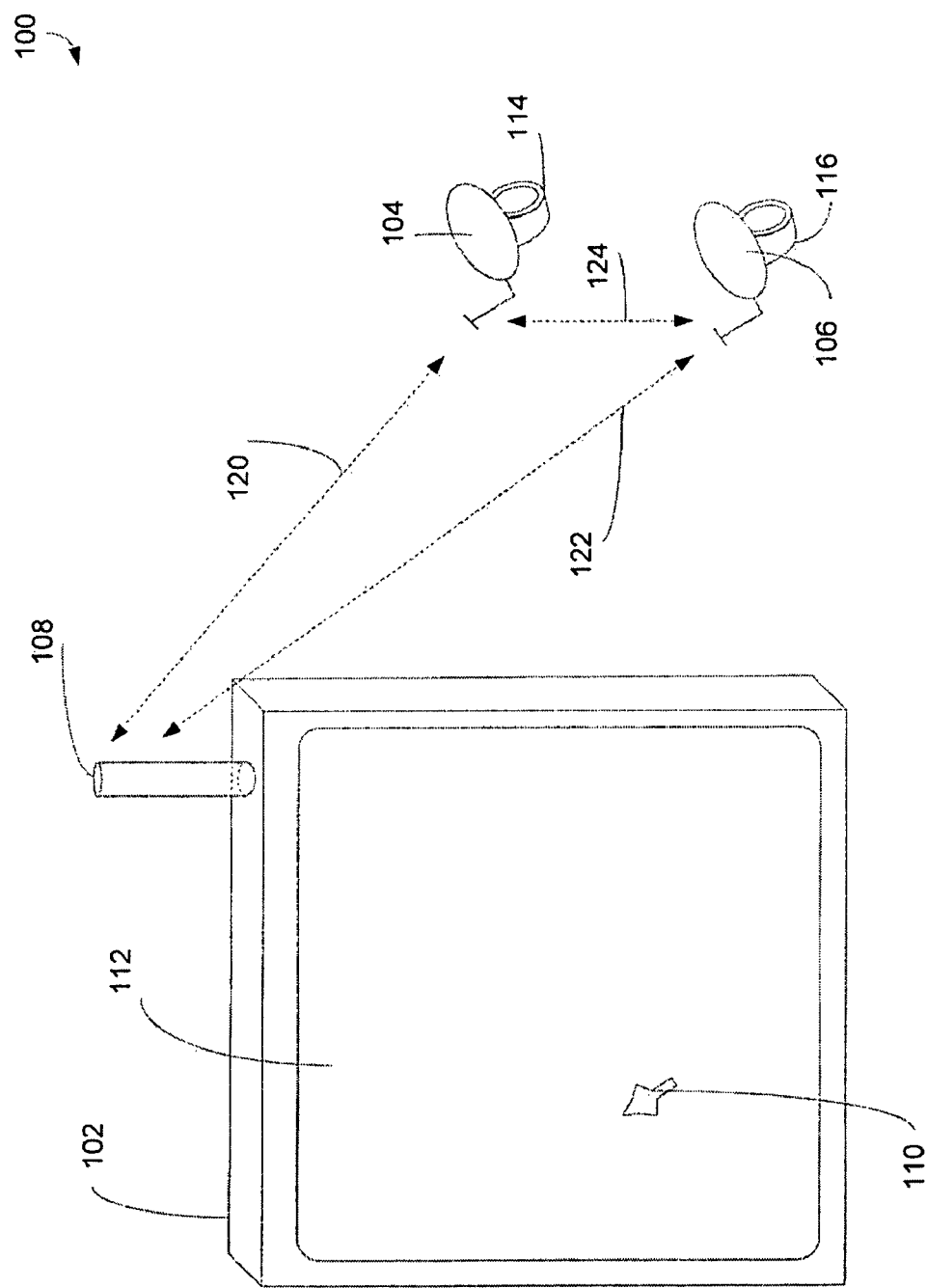
FIG. 1 is a block diagram illustrating a system using a pair of motion dots in accordance with one embodiment of the present invention.

FIG. 1 is a block diagram illustrating a system 100 using a pair of motion dots in accordance with one embodiment of the present invention. System 100 includes a computer device or handheld device 102 and a pair of motion dots 104-106. Device 102 and motion dots 104-106 are logically connected via wire and/or wireless communications network. It should be noted that the underlying concept of the embodiment does not change if one or more functional elements were added to or removed from system 100.

Computer or handheld device 102 includes an antenna 108 and a display screen 112, wherein display screen 112 shows a cursor 110. Display screen 112 may be a touch screen, a flat panel display, and the like. Device 102 is configured to communicate with motion dots 104 and 106 via wireless signals 120-122 over a short-range wireless communications network. The short-range wireless communications network includes a personal area network ("PAN") and/or a WLAN. PAN includes, but not limited to, Bluetooth, Ultra Wideband, ZigBee, Ultra-WideBand (UWB), WiMax, or Ambient networks. Alternatively, device 102 also supports one or more types of communication protocols, such as TCP/IP, UDP, http, SNMP, cellular (GPRS, CDMA, GSM, CDPD, 2.5G, 3G, etc), and/or other ad-hoc/mesh network technologies. It should be noted that the advantage of using the existing networking infrastructures is to enhance the flexibility and to reduce the implementation cost. Device 102 can be a PDA, a cellular phone, a portable device, a laptop computer, a smart phone, an iPhone®, a television, and the like.

Motion dots 104-106 is a user interface ("UI") device used to communicate with device 102 via the wireless communications network 120-122. The motion dots, in one embodiment, have unique identifiers "IDs" to allow device 102 to differentiate between the dots. The unique ID may be encapsulated into the input data or acceleration data or motion data transmitted between each motion dot and device 102. Each computer or portable device will recognize the source of the data from the ID, and process the motion data in accordance with the source of the data. Unique IDs, for example, should prevent interference when motion dots from two or more computer devices are used close together. Unique IDs may further allow collaborative work from multiple sets of motion dots with a single handheld device. For example, if two or more users, outfitted with a pair of motion dots each, were to work on a handheld device collaboratively, the device can distinguish and interpret each user's gestures and assign the appropriate command/action. In this way, two or more users can collaboratively arrange objects on a same display screen. In an alternative embodiment, collaboration can share motion information with one or more display devices. For example, two or more users use motion dots to collaborate while looking at their own screens. The collaborating feature is particularly advantageous for users located at different geographic locations. For instance, if participants of a remote sales meeting were all outfitted with motion dots, they could collaboratively manipulate charts and graphs to present the information to interested parties.

Motion dots 104-106 include antennas and fasten mechanism 114-116, wherein motion dots 104-106 may be attached to two fingers. In one embodiment, fasten mechanism 114-116 of motion dots 104-106 include ring configurations capable of attaching to fingers. It should be noted that other means of attaching mechanism for motion dots 104-106 are available, such as adhesive backing, a hook, and/or loop (i.e., Velcro) securing means.

Each motion dot is capable of communicating with handheld device 102 and/or a nearby neighboring motion dot. For example, motion dot 104 uses a short range communications network 120 to communicate with handheld device 102 and uses another short range communications network 124 to communicate with a nearby neighboring motion dot 106. Motion dots 104-106, in one embodiment, use short range communications network 120 to identify a relative geographic (or physical) position between motion dots 104-106. It should be noted that more motion dots may be used. For example, motion dots may be placed on all ten fingers depending on the application intended by the user.

In operation, motion dots 104-106 are attached to a user's finger such as the thumb and index finger and capable of detecting the relative movements between the fingers. Upon detecting the movements of fingers, motion dots 104-106 identify one or more user inputs and subsequently, forward the user inputs to handheld device 102 via wireless communications network 120-122. Motion dots 104-106 are the remote UI device that allows inputs to be entered independent from a handheld device 102.

An advantage of using the motion dots as an UI device is to remove an input mechanism such as touch pad and "mini-keyboard" from a handheld device. Another advantage of using the motion dots is to allow a user to enter inputs in a more naturally, intuitive three-dimensional (3D) space.

Figure 2:
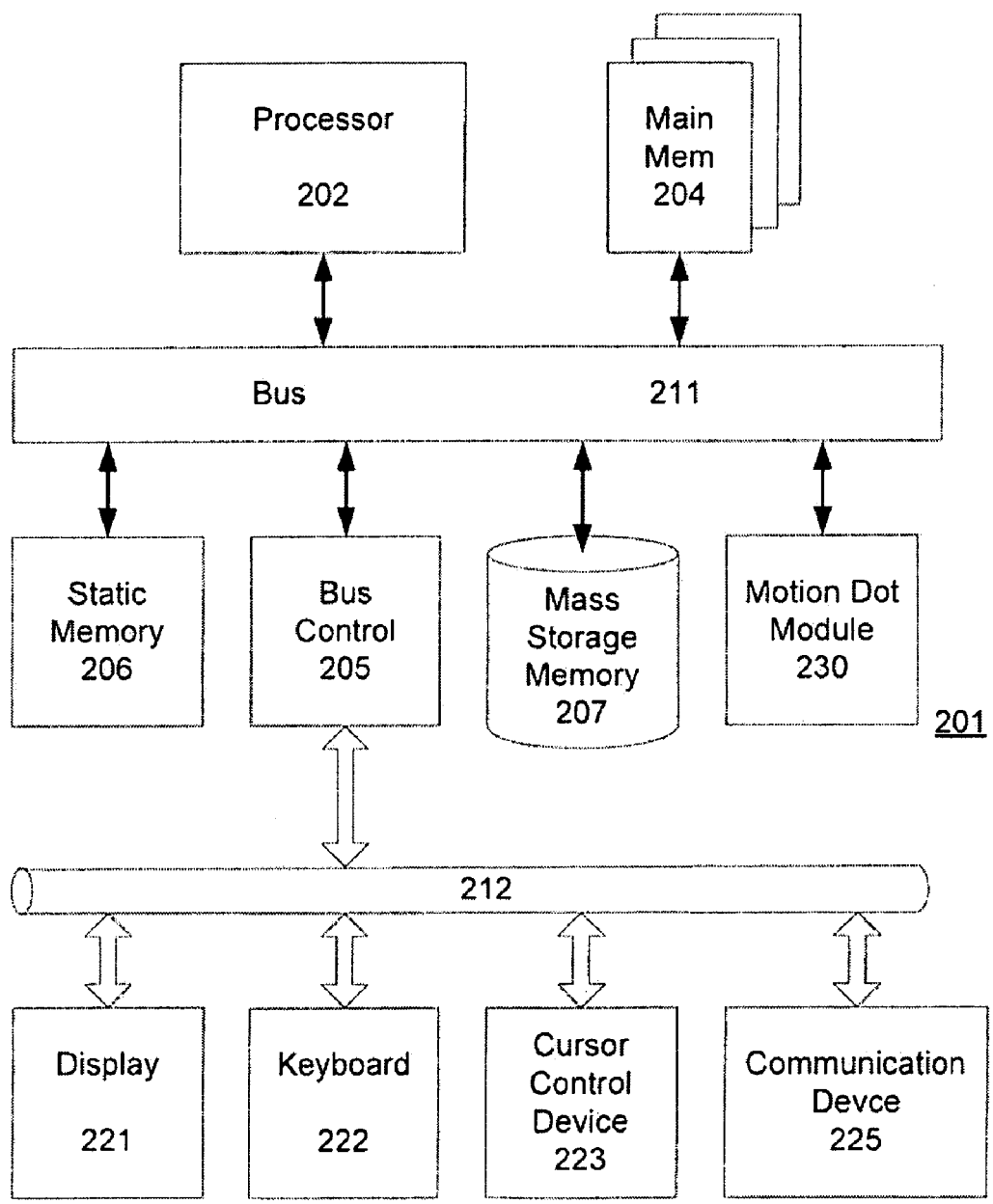
FIG. 2 is a hardware block diagram illustrating a portable device capable of using motion dots in accordance with one embodiment of the present invention.

Having briefly described one embodiment of remote UI device using a short arrange wireless network environment in which the present exemplary embodiment operates, FIG. 2 illustrates a portable device or a handheld device or computer system 200 capable of using motion dots as a UI device in accordance with one embodiment of the present invention. Computer system 200 includes a processing unit 201, an interface bus 211, and an input/output ("IO") unit 220. Processing unit 201 includes a processor 202, a main memory 204, a system bus 211, a static memory device 206, a bus control unit 205, a mass storage memory 207, and a production planning module 230. Bus 211 is used to transmit information between various components and processor 202 for data processing. Processor 202 may be any of a wide variety of general-purpose processors, embedded processors, or microprocessors such as ARM® embedded processors, Intel® Core™2 Duo, Core™2 Quad, Xeon®, Pentium™ microprocessor, Motorola™ 68040, AMD® family processors, or Power PC™ microprocessor.

Main memory 204, which may include multiple levels of cache memories, stores frequently used data and instructions. Main memory 204 may be RAM (random access memory), MRAM (magnetic RAM), or flash memory. Static memory 206 may be a ROM (read-only memory), which is coupled to bus 211, for storing static information and/or instructions. Bus control unit 205 is coupled to buses 211-212 and controls which component, such as main memory 204 or processor 202, can use the bus. Bus control unit 205 manages the communications between bus 211 and bus 212. Mass storage memory 207, which may be a magnetic disk, an optical disk, hard disk drive, floppy disk, CD-ROM, and/or flash memories for storing large amounts of data, may optionally coupled to bus 211.

I/O unit 220 includes a display 221 and optionally includes keyboard 222, cursor control device 223, and communication device 225. Display device 221 may be a liquid crystal device, cathode ray tube ("CRT"), touch-screen display, or other suitable display device. Communication device 225 is coupled to bus 211 for accessing information from remote computers or servers, such as server 104 or other computers, through wide-area network or wireless communications networks. Communication device 225 may include a modem or a network interface device, or other similar devices that facilitate communication between portable computer 200 and the network. Motion dot module 230 is configured to communicate with one or more motion dots connected through one or more wireless communications networks.

Figure 3:
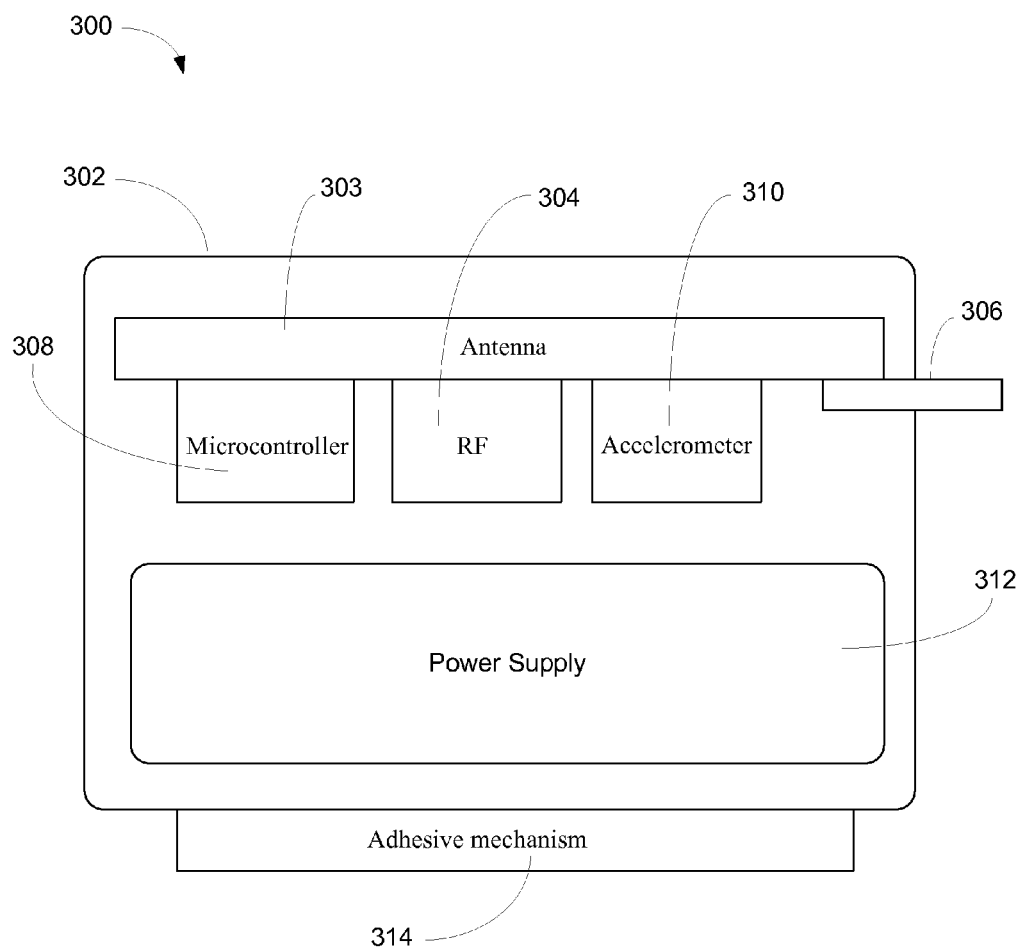
FIG. 3 is a hardware block diagram illustrating a motion dot attachable to an object in accordance with one embodiment of the present invention.

FIG. 3 is a hardware block diagram illustrating a motion dot 300 attachable to an object in accordance with one embodiment of the present invention. Motion dot 300 includes an accelerometer 310, a radio frequency ("RF") device 304, a microcontroller 308, a power source or supply 312, an adhesive mechanism 314, and an antenna 303. Dot 300 may further include a printed circuit board ("PCB"), which is used to couple to a charging contact 306, accelerometer 310, microcontroller 308, and antenna 303. It should be noted that the underlying concept of the embodiment does not change if one or more functional elements were added to or removed from dot 300.

Accelerometer 310, in one embodiment, is a three dimensional ("3D") accelerometer capable of measuring acceleration or movement along x, y, and z coordinates or axis. Accelerometer 310 includes an x-axis accelerometer, a y-axis accelerometer, and/or a z-axis accelerometer and is capable of detecting a 3D physical movement relating to motion dot 300. Physical movement includes a geographic 3D motion. The accelerometers included in the motion dots capture a relative position and motion/acceleration in the space, along, x, y, and z axis of the thumb, forefinger, and/or hand. The data detected by accelerometer 310, for example, is processed by microcontroller 308.

Microcontroller 308 on the motion dot, in one embodiment, decides when to gather the motion data, when to transmit the data, and when to conserve power. Upon receipt of movement information from accelerometer 310, microcontroller 308 identifies the relative physical position in response to a home position or reference point. For instance, microcontroller 308 tracks and updates the home position continuously whereby a relative physical position for a pair of motion dots can be accurately obtained. It should be noted that a relative physical position is easier to obtain than an absolute physical position.

Microcontroller 308 also provides power management to control power consumption and data transmission mode. To conserve power, microcontroller 308 may take discrete snapshots such as $\frac{1}{10}^{th}$ of a second interval for data transmission. Moreover, microcontroller 308 may instruct motion dot 300 to enter sleep state between finger movements for power conservation. The radio transmission of RF device 304, which transmits acceleration data via antenna 303, may also be controlled by microcontroller 308.

Power supply 312 may include a disposable battery, a rechargeable battery, a solar battery, a kinetic energy generator, or a combination of batteries and kinetic generators. The rechargeable battery is capable of charging the rechargeable battery via charging connector 306, while kinetic energy generator is capable of generating power via movements and/or velocities. In one embodiment, power supply 312 includes a power management component to regulate dot power consumption. For example, to minimize power consumption, transmitting information between motion dots and device at a moderate rate than a constant or continuous rate.

Adhesive mechanism 314 includes an attaching mechanical form that is capable of attaching to an object. For example, adhesive mechanism 314 may cause dot 300 to attach a thumb nail. Also, adhesive mechanism 314 may be a ring shape that fits into a finger or a cot shape that fits into the tip of a finger. Other attachment methods such as Velcro or adhesion may be used to perform the similar fastening function.

Dot 300, in one embodiment, further includes a gyroscope and a casing apparatus.

Gyroscope is used to sense the orientation of dot 300. For example, Gyroscope can detect rotating motion. Casing apparatus encloses or encapsulates dot 300 into a small case such as 10×10×4 millimeters. Potting material 302 such as polymers may be used as filler to fill various gaps between the components in dot 300.

Figure 4:
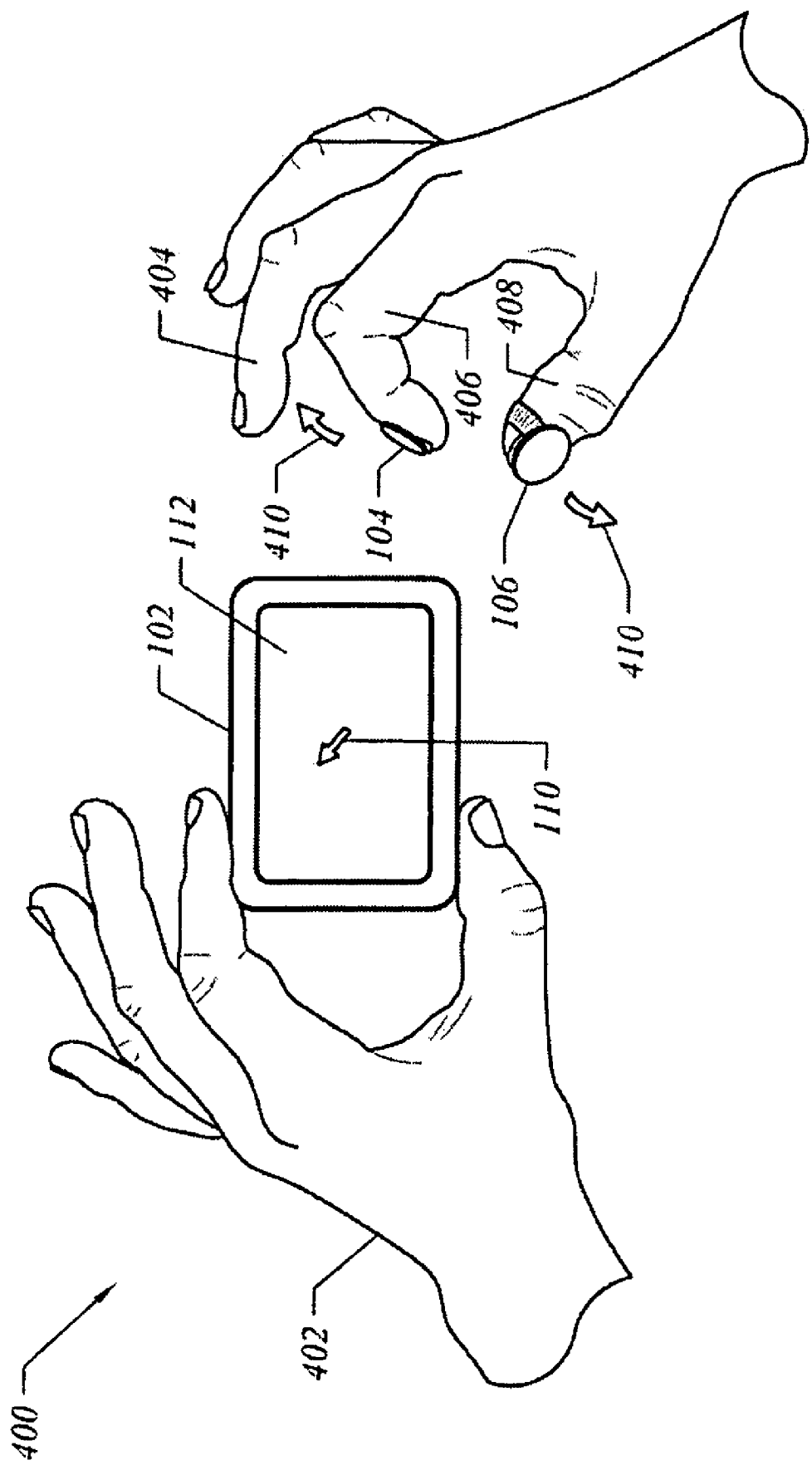
FIG. 4 illustrates a system displaying a graphical object in response to a pair of motion dots in accordance with one embodiment of the present invention.

FIG. 4 illustrates a system 400 displaying a graphical object 110 in response to a pair of motion dots 104-106 in accordance with one embodiment of the present invention. System 400 shows a portable device 102 and two motion dots 104-106, wherein motion dots 104-106 are used as a UI device for device 102. Referring back to FIG. 4, a user's left hand 402 is holding portable device 102 and a user's right hand 404 is wearing motion dots 104 and 106 on forefinger 406 and thumb 408, respectively. It should be noted that the underlying concept of the embodiment does not change if one or more functional elements were added to or removed from system 400.

Motion dots 104-106 is logically coupled with device 102 via a wireless communications network such as a PAN. The wireless communications network facilitates information transfer between motion dots 104-106 and device 102. For example, a graphical object or cursor 110 is displayed on display screen 112 in response to inputs entered via motion dots 104-106. It should be noted that device 102 is configured to perform various functions such as cursor movements and image displays in accordance with the inputs received from two or more remote motion dots.

Motion dots 104 and 106, as shown in FIG. 4, are capable of sensing various finger motions. For instance, motion dots 104-106 can sense index finger 406 and thumb 408 moving apart as indicated by arrows 410. Arrows 410 show the movement of the hand diagonally up and down. Note that while both fingers are in motion, there is a relative motion between the two fingers and their corresponding motion dots in accordance with a previously identified home position (or reference point).

System 400, in one embodiment, is configured to identify an input or inputs from a motion or a sequence of motions. A sequence of motion includes finger joining, finger release, lifting, putting, panning, picking, and the like. In addition, they represent one or more input commands, such as home positioning, cursor pointing, file opening, and file magnifying. For example, when a cursor control input is detected, cursor 110 will move in accordance with the movement of the fingers. For instance, as the hand moves diagonally up and to the user's right, cursor 110 will move toward the upper right hand corner of display screen 112. Similarly, as the hand moves diagonally down and to the user's left, cursor 110 will move toward the bottom left corner of screen 112.

An advantage of using system 400 is to separate the UI device from a portable device. The UI device is moved from a portable device to user's fingers, which allow the hand or fingers to work free from the touch screen or device itself. Motion dots 104-106 having multiple 3D accelerometers and wireless capabilities can be attached to user's fingernails, which, for example, communicate with a device 102 via a short distance radio frequency network.

Another advantage of using system 400 is to add or leverage a 3D input command, such as "picking" and "placing"

command gestures. The motion measured by motion dots 104 and 106 may include 3D while the display screen 112 renders objects and movements in two dimensions (2D). Using techniques such as object size and shading, objects may be rendered in a simulated 3D.

A sensed motion, for example, is a relative motion between two motion dots. Finger relative motion is one of the natural motions that can be detected. Finger relative motion is, for example, any combination of finger motions that create independent motions of the fingers. For instance, brushing the thumb with the opposing finger creates a relative motion in the line of the thumb, which may be a natural gesture for list scrolling. Finger joining is another one of the natural motions that can be detected. Finger joining, for example, causes the two fingers to join together and become joined in their motion. Finger joining starts with finger relative motion and ends in the fingers moving together. An example of finger joining is a picking gesture. To detect a finger joining, the motion dots report substantially the same accelerations. Alternatively, finger release may be the opposite of finger joining.

Figure 5:
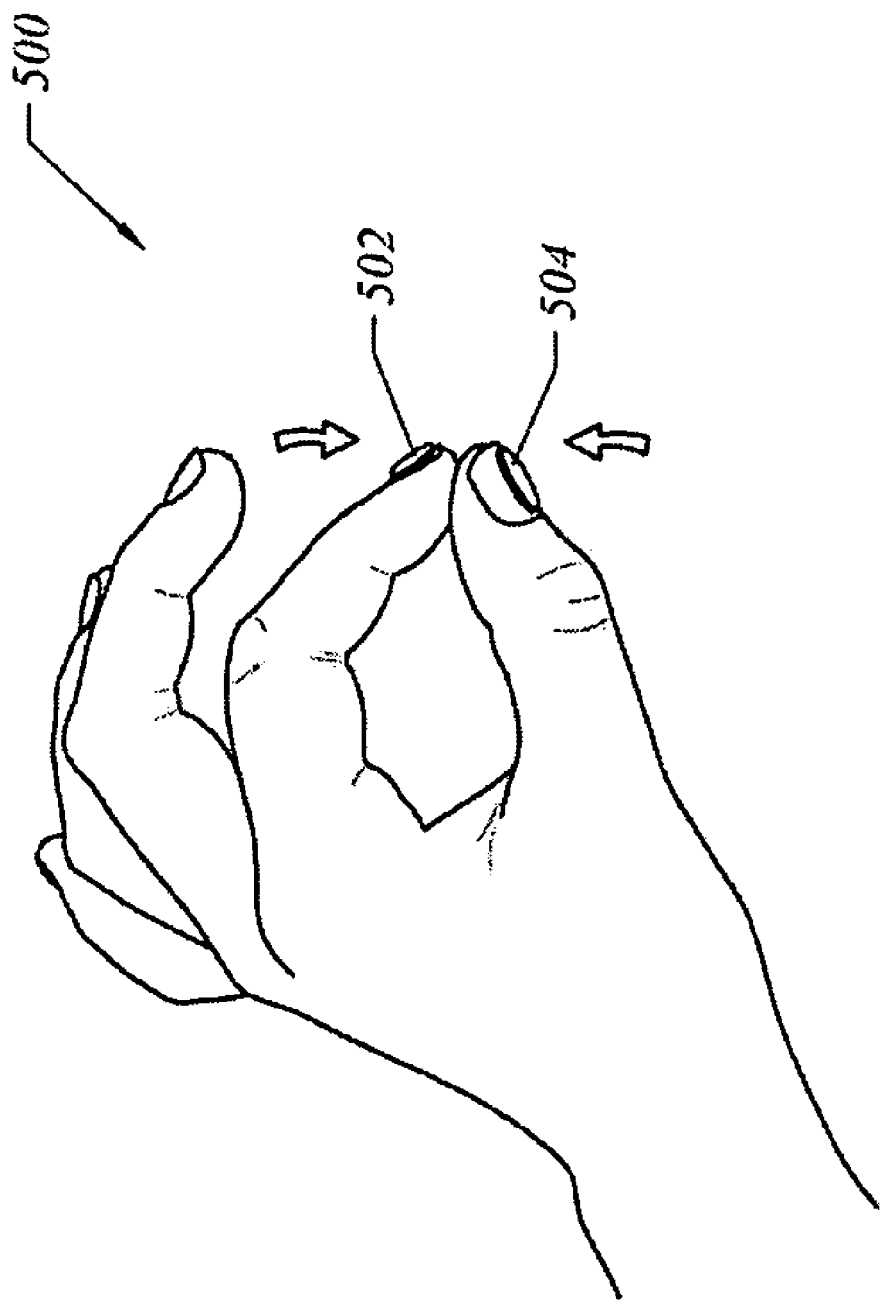
FIG. 5 is an example of relative motion illustrating a command input in accordance with one embodiment of the present invention.

FIG. 5 is an example of relative motion illustrating a command input in accordance with one embodiment of the present invention. In this example, motion dots 502 and 504 are placed on the thumb and forefinger of a user's left hand. Various hand and finger gestures identified by the relative motion and transmitted by the motion dots may be assigned to various actions or commands by a portable device. For example, the arrows show the thumb and forefinger approaching to each other or closing. This relative motion may translate this type of relative motion as a grasping or "picking" motion. In turn the display device may display the closing fingers gesture as an icon representing grasping.

Furthermore, if a cursor is moved to an object on the display screen prior to performing a "picking" motion, the portable device may translate this series of motion as grabbing or picking a file or object. Continuing with this example, while holding the index finger 502 and thumb 504 together, the user moves her hand orthogonal to horizontal plane of the object. The processor may be programmed to translate this series of motions as lifting the object up from the horizontal plane.

Figure 6:
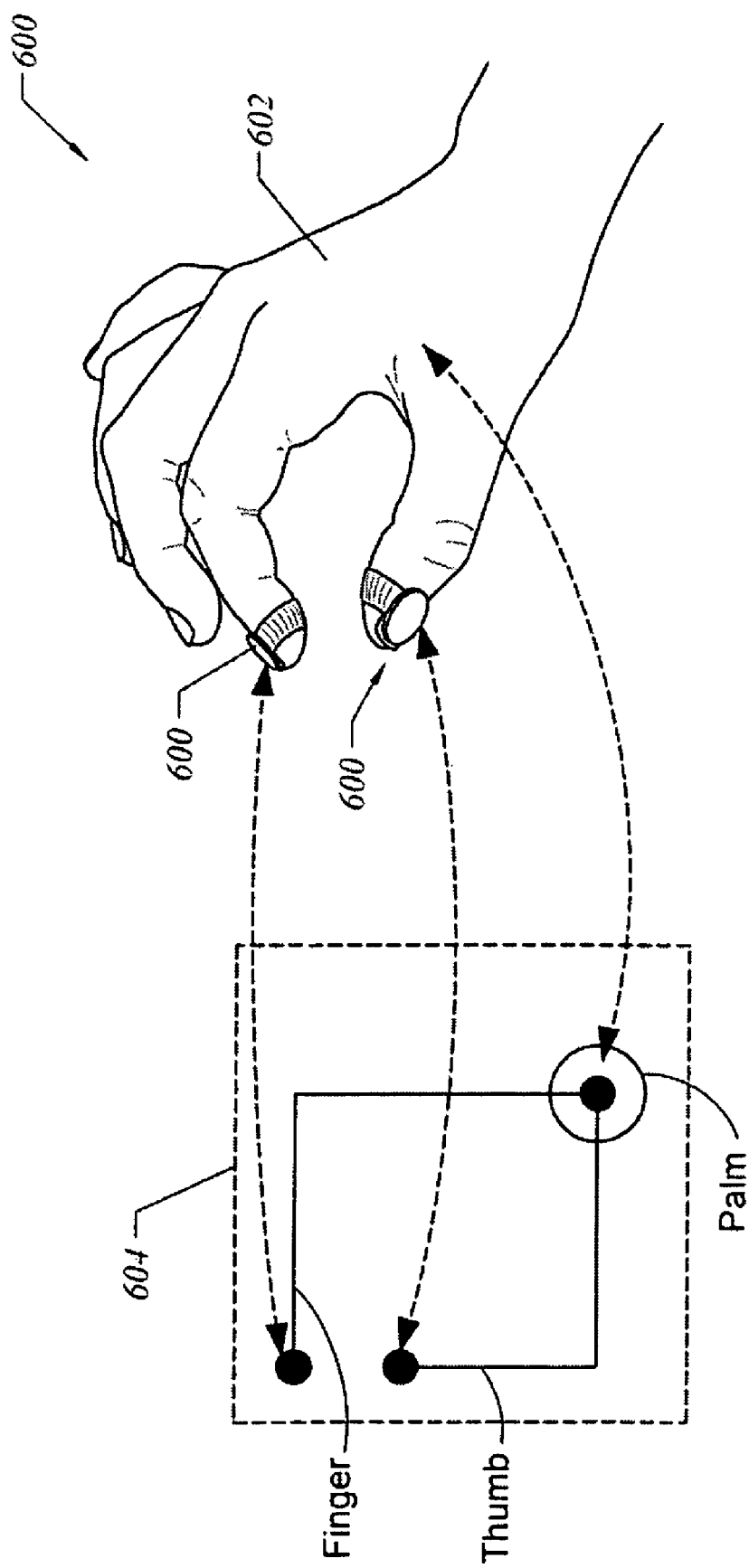
FIG. 6 is a block diagram illustrating a computer representation of a hand with a pair of motion dots in accordance with one embodiment of the present invention.

FIG. 6 is a block diagram 600 illustrating a computer representation of a hand 602 with a pair of motion dots in accordance with one embodiment of the present invention. Diagram 600 includes a hand 602 and a computer representation 604, wherein computer representation 604 illustrates a computer graphical representation of a hand with two dots 600. Two motion dots 600 are placed on the thumb and forefingers of hand 602. Graphical representation 604 includes a line representing an index finger and another line representing a thumb, wherein both lines merged at a point called palm. Upon receipt of physical locations of two dots 600, the handheld device or computer, in one embodiment, can calculate or identify the location of palm in accordance with relative physical position.

FIGS. 7A-C are exemplary diagrams illustrating computer graphic representations for various detectable input commands in accordance with one embodiment of the present invention. FIG. 7A illustrates a schematic representation 700 of a hand with motion dot 702 attached to a forefinger and motion dot 704 on a thumb. Schematic representation 700 further includes a location of palm 706, which may be derived from the relative physical position between motion dots 702-704 or sensed via a sensing device. For example, palm 706 may be obtained through a mathematic algorithm once the relative physical location between motion dots is identified. Alternatively, an additional motion dot may be attached to palm 706.

Motion dots 702 and 704 are held slightly apart from each other as well as slightly away from palm 706. Representation 700, in one embodiment, is a default position or a home position for the beginning of various hand gestures. It should be noted that the home position may be updated continuously or set at a predefined fixed relative position.

FIG. 7B illustrates a graphic representation 720 showing a finger joining position in accordance with one embodiment of the present invention. Representation 720, for example, starts from the home position as illustrated in FIG. 7A and allows motion dots 702 and 704 to join together, i.e., the thumb and forefinger move close in a direction indicated by arrows 708. To detect a finger joining motion, the handheld device receives acceleration data or motions indicating that the motion dots or fingers are moving toward each other at a fairly equal acceleration. At some point, the fingers contact, motion dots detect a sudden and immediate deceleration or stop, which may be translated into one or more motions, such as the end of the picking motion, object captured, object grabbed, or the likes. For example, if the cursor is in proximity of an object when the picking motion ends, the device may interpret this as the cursor grabbing that object. So long as motion dots 702 and 704 remain joined together, the "picked" object stays with the cursor. In an alternative embodiment, finger joining position indicates a home position. It should be noted that home position may be updated continuously. Alternatively, home position is a fixed relative position between the fingers, such as a finger joining position.

FIG. 7C illustrates a graphic representation 740 showing a finger's separation position in accordance with one embodiment of the present invention. Representation 740, for example, starts from the home position or finger joining position and allows motion dots 702 and 704 to separate from each other according to arrows 710. A computer device or handheld device, for example, is programmed to interpret this equal and opposite motion as a "dropping" action. Thus whatever object was held by the previous "picking" action is now dropped by this hand gesture.

FIGS. 8A-C are exemplary diagrams illustrating additional computer graphic representations for input commands in accordance with one embodiment of the present invention. Refer now to FIGS. 8A and 8B. Starting from a finger joined position with motion dots 702 and 704 together, the entire hand moves in the direction of the twin arrows 802 and 804. With no relative motion between the two motion dots, and equal acceleration of both motion dots, a computer device or portable device, in one embodiment, recognizes this hand gesture as a command for the cursor to move in the directions pointed by arrows 802 and 804. As an example, double arrows 802 are pointing up and the hand with fingers together is moving in an upward direction relative to the earth. Correspondingly the computer device would interpret this motion as lifting whatever object is held by the cursor. Similarly the opposite downward motion as indicated by arrow 804 would be interpreted as placing the object down.

FIG. 8C illustrates a graphical representation 840, which shows that motion dot 704 attached to the thumb remains motionless with respect to the other fingers, while motion dot 702 attached to the forefinger moves towards and/or away from palm 706 as illustrated by double headed arrow 806. The hand gesture responsible for this schematic representation, for example, would be a forefinger moving back and forth from the tip of the thumb to the base of the thumb and back again. Such a motion may correspond with a scrolling command. The acceleration of the forefinger with respect to the thumb would, for instance, correspond with the speed at which the page scrolls.

Figure 9D:
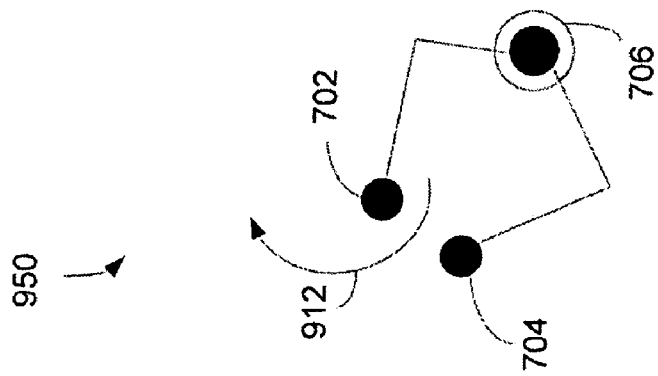

FIGS. 9A-E are additional diagrams illustrating computer graphic representations for additional input commands in accordance with one embodiment of the present invention. FIG. 9A illustrates a graphical representation or schematic 900 showing a selection motion. Schematic 900 depicts motion dot 702 accelerating towards motion dot 704 while the latter remains stationary. At some point motion dot 702 will reach motion dot 704 and decelerate. The hand gesture depicted by schematic 900 may be the forefinger of one hand touching the thumb of the same hand. The computer or portable device, in one embodiment, is programmed to translate this hand gesture as a selection command. For example, this gesture may be useful in selecting a menu option, opening or closing a file, or selecting a word or line, etc.

FIG. 9B shows a schematic 920 illustrating a hand gesture relating to turning or rotating motion. For example, motion dots 702 and 704 are shown moving in an arc in the direction represented by arrows 904 and 906, respectively. The hand gesture represented by schematic 920 is the forefinger of one hand moving in a counterclockwise arc and at the same time the thumb of the same hand moving in a similar counterclockwise arc. As an example, this hand motion may be similar to a person using the thumb and forefingers of one hand to open or close a lid of a jar. It should be noted that the palm of the hand does not move during the hand gesture. In one embodiment, the "rotating" gesture illustrated in FIG. 9B is assigned to a command for rotating an object pointed by the cursor. For example a user may use a combination of the "picking", "lifting", and "rotating" gestures to seize an object, lift it up away from its previous position, and rotate it in place.

Figure 9C:
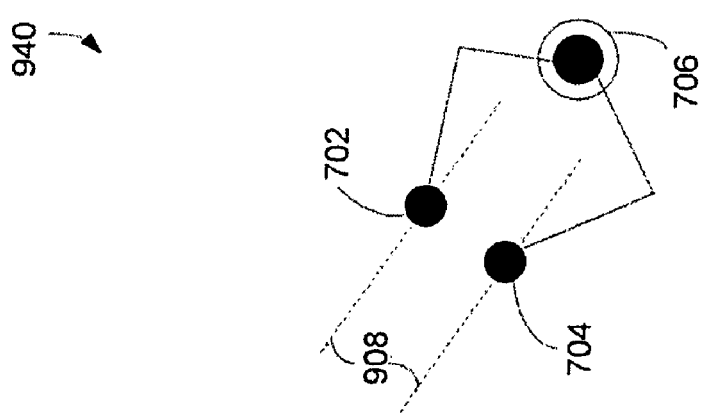

FIG. 9C shows a schematic 940 illustrating a hand gesture relating to a panning motion. The panning motion is a gesture that two fingers have a fixed relative distance between each other. For example, thumb having motion dot 704 and index finger having motion dot 702 have a fixed relative distance 908 between the thumb and the index finger. Panning motion, in one embodiment, can be predefined for a specific input command such as highlighting and/or measuring functions.

FIG. 9D shows a schematic 950 illustrating a hand gesture relating to a flicking motion. Motion dot 702, in one embodiment, travels in an arc away from motion dot 704 as shown by arrow 912. The forefinger of one hand, starting in close proximity to the thumb, rapidly accelerates in an arc away from the thumb. This "flicking" gesture may be assigned to a command such as rapid scrolling. The magnitude of the acceleration may control the duration in which pages are displayed and the quantity of pages displayed. For example, a short "flick" wherein the forefinger starts at the tip of the thumb may only scroll through a few pages, while a longer "flick" with a higher acceleration may scroll though dozens of pages at a time.

FIG. 9E shows a schematic 930 illustrating a hand gesture relating to a magnifying motion. Motion dots 702-704, in one embodiment, traveling in directions indicated by arrow 934 illustrate a zoom out command. Alternatively, index finger having motion dot 702 and thumb having motion dot 704 move in directions indicated by arrows 932 indicate a zoom in command. It should be noted that the magnifying motion may be assigned to a different motion or a sequence of motions depending on user's application and preference.

FIG. 10 is an example of a 3D representation 1000 illustrating a command input in accordance with one embodiment of the present invention. Representation 1000 includes a display screen 112 containing a graphic picture, and a hand 602 wherein hand 602 wears two or more motion dots, not shown in FIG. 10. In one embodiment, when the index finger of hand 602 moves up and down in z direction 1006, diameter 1004 of cursor changes its size to express the depth of the index finger in z direction 1006. For example, if the index finger moves down, diameter 1004 of cursor becomes small and if the index finger moves up, diameter 1004 of cursor becomes large. It should be noted that representation 1000 expresses a 3D motion in a two dimensional (2D) representation.

Touch screens or touch pads or flat panel displays are limited to 2D. Accelerometers, however, allow the detection of motion in 3D. For example, finger joining gesture may be followed by a lifting motion (joining on one plane and lifting in a direction orthogonal to that plane). As such, using a 2D media to represent a 3D motion can be challenge. A handheld device using a pair of remote UI device may also use an adaptive algorithm to learn certain user specific gestures to enhance the performance.

The exemplary embodiment(s) of the present invention includes various processing steps, which will be described below. The steps of the embodiments may be embodied in machine or computer executable instructions. The instructions can be used to cause a general purpose or special purpose system, which is programmed with the instructions, to perform the steps of the present invention. Alternatively, the steps of the present invention may be performed by specific hardware components that contain hard-wired logic for performing the steps, or by any combination of programmed computer components and custom hardware components. While embodiments of the present invention will be described with reference to the Internet, the method and apparatus described herein is equally applicable to other network infrastructures or other data communications environments.

Figure 11:
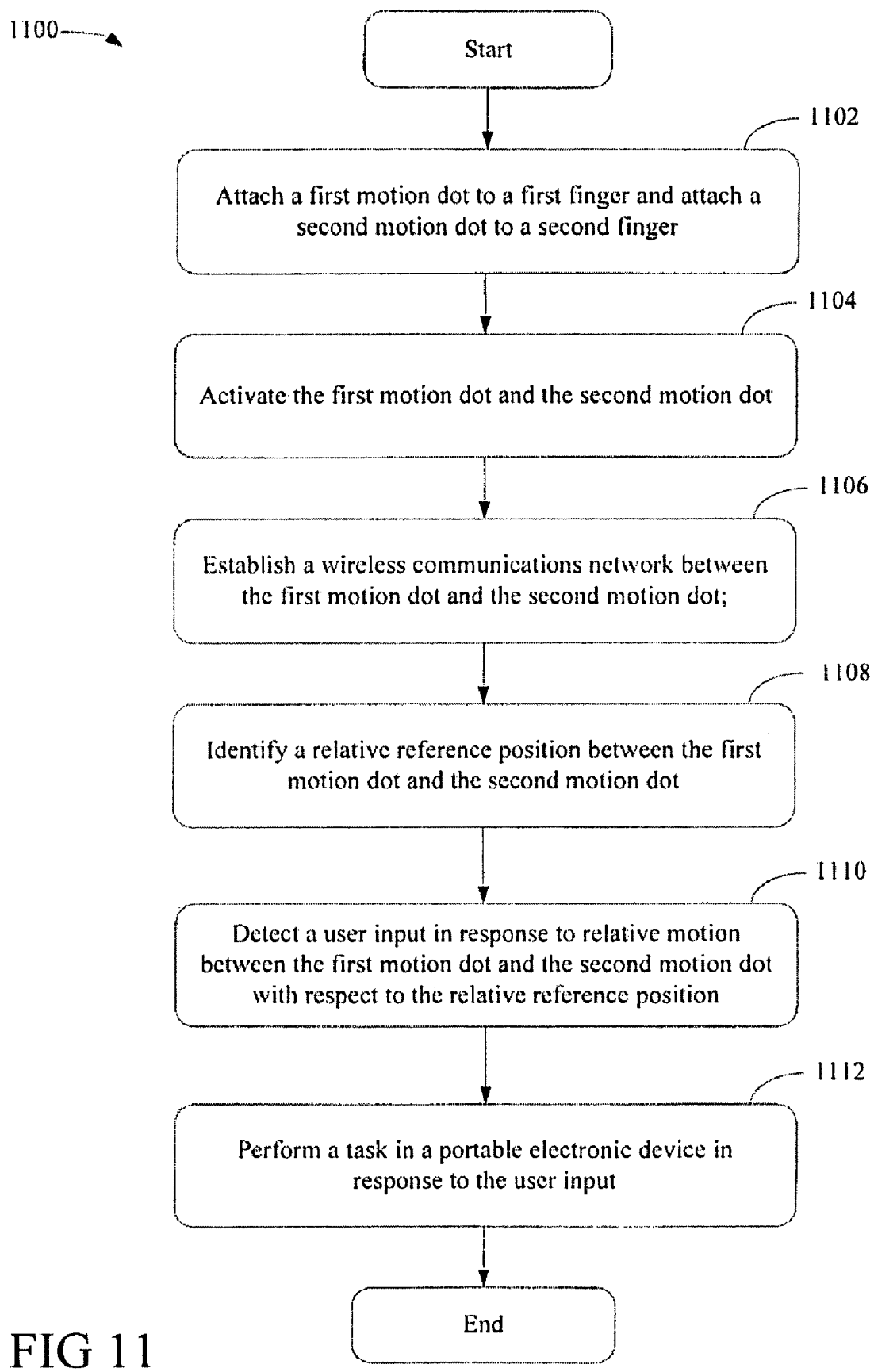
FIG. 11 is a flowchart illustrating a process of receiving user inputs from a pair providing a remote wearable interface device in accordance with one embodiment of the present invention.

FIG. 11 is a flowchart illustrating a process of receiving user inputs from a pair providing a remote wearable interface device in accordance with one embodiment of the present invention. At block 1102, the process attaches a first motion dot to a first finger and attaches a second motion dot to a second finger. In one embodiment, the first finger is a thumb and the second finger is an index finger. After block 1102, the process proceeds to the next block.

At block 1104, the process activates the first motion dot and the second motion dot. In one embodiment, a third motion dot is attached to a third finger and it is activated. Each motion dot, for example, may include a microprocessor, a memory, a power supply, one or more accelerometers, and so on. After block 1104, the process proceeds to the next block.

At block 1106, the process establishes a wireless communications network between the first motion dot and the second motion dot. For example, the wireless communications network may be a wireless personal area network ("PAN") for providing communications between the first motion dot, the second motion dot, and the portable electronic device. It should be noted that PAN is a wireless network used for communications between portable devices. The coverage of PAN is generally several feet and is used for intrapersonal communications. The process, in one embodiment, recognizes multiple unique identifiers for multiple motion dots, wherein unique identifiers facilitate collaborative work. After block 1106, the process moves to the next block.

At block 1108, the process identifies a relative reference position between the first motion dot and the second motion dot. For example, home position may be set for finger joining motion, wherein the process senses a finger joining motion between the first motion dot and the second motion dot. After block 1108, the process moves to next block.

At block 1110, the process detects a user input in response to relative motion between the first motion dot and the second motion dot with respect to the relative reference position. In one embodiment, the process detects finger movements in accordance with 3D accelerometers. Alternatively, the process identifies one of the finger relative motion, finger joining motion, finger release motion, finger lifting motion, putting motion, and scrolling motion. After block 1110, the process moves the next block.

At block 1112, the process performs a task in a portable electronic device in response to the user input. The process further displays a pictorial image on a display in the portable electronic device representing the relative motion. The process also instructs the portable device to enter a sleep mode or to wake up from the sleep mode to conserve power consumption. The process further establishes a wireless communications network between the first motion dot and the second motion dot and the third motion dot. For example, a relative motion is a motion between the first motion dot and the second motion dot and the third dot with respect to the relative reference position.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope all such changes and modifications as are within the true spirit and scope of the exemplary embodiment(s) of is present invention.

What is claimed is:

1. A user interface device comprising:
    a first motion dot operable to attach to a first finger, wherein the first motion dot includes multiple accelerometers for identifying a physical location of the first motion dot, wherein the first motion dot includes a power supply capable of regulating power consumption of the first motion dot;
    a second motion dot logically coupled to the first motion dot via a wireless communication network and configured to attach to a second finger, wherein the second motion dot having multiple accelerometers is capable of detecting a user input in response to a relative physical position between the first motion dot and the second motion dot;
    a third motion dot logically couple to the second motion dot and configured to attached to a third finger, wherein the third motion dot is configured to detect a user input in response to a relative motion between the second motion dot and the third motion dot; and
    a handheld device logically coupled to the second motion dot, wherein the handheld device is capable of receiving the user input via a wireless communications network.

2. The device of claim 1, wherein handheld device displays a pictorial image on a display reflecting the relative physical position.

3. The device of claim 1, wherein the first motion dot includes a first gyroscope to identify a first orientation of the first motion dot.

4. The device of claim 1, wherein the first motion dot includes:
    a transceiver capable of facilitating wireless communications;
    a battery coupled to the transceiver and configured to supply power; and
    a controller coupled to the battery and configured to control communications.

5. The device of claim 4, wherein the controller further provide power management for entering a sleep mode or waking up from the sleep mode for power conservation.

6. The device of claim 1, wherein the second motion dot includes an x-axis accelerometer, a y-axis accelerometer, and a z-axis accelerometer for identifying a relative physical position between the first motion dot and the second motion dot.

7. The device of claim 6, wherein the second motion dot includes an attachment mechanism for attaching the second motion dot to the second finger.

8. The device of claim 1, wherein the first finger is a thumb and the second finger is an index finger.

9. The device of claim 8, wherein the user input includes identifying one of finger relative motion, finger joining motion, finger release motion, finger lifting motion, putting motion, and scrolling motion.

10. A method for providing device interface comprising:
    attaching a first motion dot to a first finger, attaching a second motion dot to a second finger and attaching a third motion dot to a third finger;
    activating the first motion dot, the second motion dot and the third motion dot;
    establishing a wireless communications network among the first motion dot, the second motion dot and the third motion dot;
    facilitating information transfer among the first motion dot, the second motion dot and the third motion dot via the wireless communications network;
    identifying a relative reference position among the first motion dot, the second motion dot and the third motion dot;
    detecting a user input in response to relative motion among the first motion dot, the second motion dot and the third motion dot with respect to the relative reference position; and
    performing a task in a portable electronic device in response to the user input; and
    entering a sleep mode or waking up from the sleep mode to conserve power consumption.

11. The method of claim 10, further includes displaying a pictorial image on a display in the portable electronic device representing the relative motion.

12. The method of claim 10, wherein establishing a wireless communications network includes activating a wireless personal area network for providing communications between the first motion dot, the second motion dot, and the portable electronic device.

13. The method of claim 10, wherein identifying a relative reference position between the first motion dot and the second motion dot further includes sensing finger joining motion between the first motion dot and the second motion dot.

14. The method of claim 10, wherein detecting a user input in response to relative motion between the first motion dot and the second motion dot with respect to the relative reference position further includes detecting finger movements in accordance with three-dimensional accelerometers.

15. The method of claim 10, wherein detecting a user input in response to relative motion between the first motion dot and the second motion dot with respect to the relative reference position further includes identifying one of finger relative motion, finger joining motion, finger release motion, finger lifting motion, putting motion, and scrolling motion.

16. The method of claim 10, wherein establishing a wireless communications network includes recognizing multiple unique identifiers for multiple motion dots, wherein recognizing multiple unique identifiers further includes permitting various motion dots to work collaboratively.

17. A system comprising:
a portable electronic device having a display panel capable of display multiple images;
a first motion dot operable to attach to a first finger, wherein the first motion dot includes multiple accelerometers for identifying a physical location of the first motion dot;
a second motion dot logically coupled to the first motion dot and configured to attach to a second finger, wherein the second motion dot having multiple accelerometers is capable of detecting a user input in response to a relative physical position between the first motion dot and the second motion dot;
a third motion dot logically couple to the second motion dot and configured to attached to a third finger, wherein the third motion dot is configured to detect a user input in response to a relative motion between the second motion dot and the third motion dot;
a wireless communications network configured to route information among the first motion dot, the second motion dot and the third motion dot;
the first motion dot includes: a transceiver capable of facilitating wireless communications; a battery coupled to the transceiver and configured to supply power; and a controller coupled to the battery and configured to control communications; and
the controller further provide power management for entering a sleep mode or waking up from the sleep mode for power conservation.

18. An apparatus for providing device interface comprising:
means for attaching a first motion dot to a first finger, attaching a second motion dot to a second finger and attaching a third motion dot to a third finger;
mean for activating the first motion dot, the second motion dot and the third motion dot to a third finger;
means for establishing a wireless communications network among the first motion dot, the second motion dot and the third motion dot;
means for facilitating information transfer among the first motion dot, the second motion dot and the third motion dot;
means for identifying a relative reference position among the first motion dot, the second motion dot and the third motion dot;
means for detecting a user input in response to relative motion among the first motion dot, the second motion dot and the third motion dot with respect to the relative reference position;
means for performing a task in a portable electronic device in response to the user input; and
means for entering a sleep mode or waking up from the sleep mode to conserve power consumption.

19. The apparatus of claim 18, further includes means for displaying a pictorial image on a display in the portable electronic device representing the relative motion.

20. The apparatus of claim 18, wherein means for establishing a wireless communications network includes means for activating a wireless personal area network for providing communications between the first motion dot, the second motion dot, and the portable electronic device.

* * * * *